(12) United States Patent
Fishkin

(10) Patent No.: US 8,224,844 B1
(45) Date of Patent: *Jul. 17, 2012

(54) SEARCHING FOR USER INTERFACE OBJECTS

(75) Inventor: Kenneth P. Fishkin, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,098

(22) Filed: Aug. 5, 2011

Related U.S. Application Data

(63) Continuation of application No. 12/813,751, filed on Jun. 11, 2010, now Pat. No. 7,996,420, which is a continuation of application No. 11/857,347, filed on Sep. 18, 2007, now Pat. No. 7,739,272.

(51) Int. Cl.
*G06F 17/30* (2006.01)
(52) U.S. Cl. ....................................................... 707/769
(58) Field of Classification Search .................. 707/609, 707/705, 713, 769, 802
See application file for complete search history.

(56) References Cited

U.S. PATENT DOCUMENTS

| | | | |
|---|---|---|---|
| 5,664,133 A * | 9/1997 | Malamud et al. | 715/816 |
| 6,970,749 B1 | 11/2005 | Chinn et al. | |
| 7,024,658 B1 | 4/2006 | Cohen et al. | |
| 7,343,568 B2 | 3/2008 | Jiang et al. | |
| 7,543,244 B2 | 6/2009 | Matthews et al. | |
| 2004/0204820 A1* | 10/2004 | Diaz | 701/200 |
| 2006/0184890 A1 | 8/2006 | Altenhofen | |

OTHER PUBLICATIONS

Brent Sheets, "Help Menu search in Mac OS X Leopard," Sep. 23, 2008, printed from http://mactoids.com/help-menu-search-in-mac-os-x-leopard/, on Jun. 11, 2010.

* cited by examiner

*Primary Examiner* — Fred I Ehichioya
(74) *Attorney, Agent, or Firm* — Shumaker & Sieffert, P.A.

(57) ABSTRACT

A computer-implemented method includes searching resources related to an application in response to receiving a query, identifying an operation in the application that satisfies the query, and exposing an object that provides access to the identified operation, within the application.

33 Claims, 6 Drawing Sheets

SEARCHING FOR USER INTERFACE OBJECTS

This application is a continuation of U.S. application Ser. No. 12/813,751, entitled "SEARCHING FOR USER INTERFACE OBJECTS," filed on Jun. 11, 2010, which is a continuation of U.S. application Ser. No. 11/857,347, entitled "SEARCHING FOR USER INTERFACE OBJECTS," filed Sep. 18, 2007, now U.S. Pat. No. 7,739,272, each assigned to the assignee of the present application. The subject matter of each of the above-identified commonly owned applications is incorporated herein by reference.

TECHNICAL FIELD

This disclosure relates to information retrieval.

BACKGROUND

Software applications installed on systems, e.g., computer systems, enable users to perform a variety of operations ranging from simple text entry to complicated computations. Some applications, e.g., applications in the Microsoft® Office suite offered by Microsoft Corporation (Redmond, Wash.), are visible to the user and enable user interaction through a user interface that is provided to the user when an application is launched. Other applications, e.g., virus scanning applications, operate in the background and do not always require user interaction. Applications that offer a user interface can include one or more menus including selectable objects that represent operations that a software application can perform upon being selected by a user. An operation can be represented by a corresponding title containing text or icon containing an image, or both, and displayed in the user interface.

SUMMARY

In one example, a user can enter a query in a text box displayed in a user interface of an application, e.g., Microsoft® Office PowerPoint®, offered by Microsoft Corporation (Redmond, Wash.). The query can be related to an operation that the application can perform, e.g., inserting pictures from a scanner or camera into a slide. An object corresponding to the operation made available through the user interface, e.g., as a choice in a menu of operations, can be identified to the user in response to receiving the query. The application's resources, e.g., program files related to the application, can be searched and the location of the object corresponding to the operation can be identified. Subsequently, the location of the object, e.g., the menu where the object resides, can be exposed, e.g., displayed in the user interface, such that the object becomes apparent to the user. In addition, the searched operation can be performed automatically—that is, without receiving further input from the user.

In one aspect, a computer-implemented method includes searching resources related to an application in response to receiving a query from a user, identifying an operation in the application that satisfies the query, and exposing an object, within the application, that provides access to the identified operation.

This, and other aspects, can include one or more of the following features. Exposing the object can include causing a location, where the object resides, to be displayed. The method can further include highlighting the object. The location can include one or more of a menu, a tab, a dialog box, a sub-menu, a sub-tab, or a sub-dialog box. The method can further include identifying content that satisfies the query, wherein the content is unrelated to the operation, and presenting a content location of the identified content. The method can further include receiving the query from the application, wherein the query is presented in a user interface of the application.

In another aspect, a medium bearing instructions to enable one or more machines to perform operations is described. The operations include searching resources related to an application in response to receiving a query from a user, identifying an operation in the application that satisfies the query, and exposing an object, within the application, that provides access to the identified operation.

This, and other aspects, can include one or more of the following features. Exposing the object can include causing a location, where the object resides, to be displayed. The operations can further include highlighting the object. The location can include one or more of a menu, a tab, a dialog box, a sub-menu, a sub-tab or a sub-dialog box. The operations can further include identifying content that satisfies the query, wherein the content is unrelated to the operation, and presenting a content location of the identified content. The operations can further include receiving the query from the application, wherein the query is presented in a user interface of the application.

In another aspect, a system comprising an engine is described. The engine is configured to search resources related to an application in response to receiving a query from a user, identify an operation in the application that satisfies the query, and expose an object within the application, that provides access to the identified operation.

This, and other aspects, can include one or more of the following features. The engine can further be configured to cause a location, where the object resides, to be displayed. The engine can further be configured to highlight the object. The location can include one or more of a menu, a tab, a dialog box, a sub-menu, a sub-tab, or a sub-dialog box. The engine can further be configured to identify content that satisfies the query, wherein the content is unrelated to the operation, and present a content location of the identified content. The engine can further be configured to receive the query from the application, wherein the query is presented in the user interface of the application.

In another aspect, a computer-implemented method is described. The method includes searching resources related to an application in response to receiving a query, identifying an operation in the application that satisfies the query, and automatically performing the operation.

This, and other aspects, can include one or more of the following features. The method can further include automatically performing the identified operation without further input from the user. The method can further include identifying content that satisfies the query, wherein the content is unrelated to the operation, and presenting a location of the identified content. The method can further include receiving the query from the application, wherein the query is presented in a user interface of the application.

The systems and techniques described here may provide one or more of the following advantages. Enabling a user to search for locations of objects representing operations that can be performed by an application can allow the user to exploit the features of an application by identifying operations that may not be apparent to the user. Automatically performing an operation upon identifying an operation for which the user is searching can enhance user experience. Identifying operations that an application enables a user to perform in response to receiving a query can help educate a user about the features of the application. Enabling a user to search for operations can allow the user to quickly find and execute operations which may be difficult or non-obvious to otherwise find. Further, users can find operations in the application without knowing or caring about the navigational structure of the application.

The details of one or more implementations are set forth in the accompanying drawings and the description below. Other features and advantages will be apparent from the description and drawings, and from the claims

DETAILED DESCRIPTION

Figure 1:
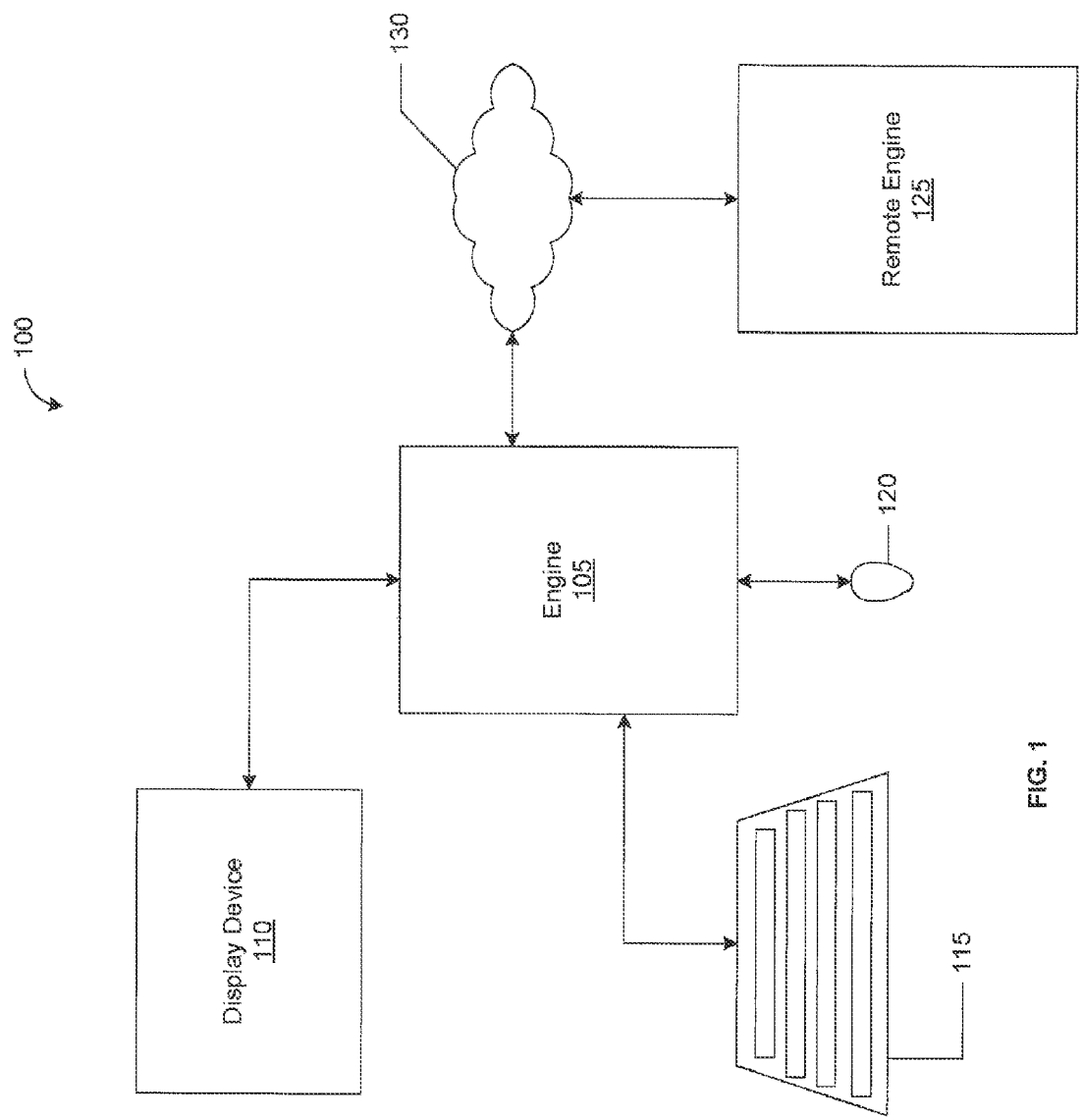
FIG. 1 is a schematic of an example of a system for searching for resources related to an application.

FIG. 1 depicts an example of a schematic of a system 100 for searching for resources related to an application. The system 100 can include an engine 105 configured to enable a user to interact with an application installed on the engine 105. The system 100 can include a display device 110 operatively coupled to the engine 105, which can display a user interface related to the installed application. The system 100 can include input devices, e.g., a keyboard 115, and a pointing device 120, e.g., a mouse, operatively coupled to the engine 105 which the user can use to interact with the application, where the results of the interaction can be displayed, e.g., in the user interface related to the application. In some implementations, the engine 105 can be operatively coupled to a remote engine 125 over a network 130, where the remote engine 125 can be, e.g., a host of a web site, e.g., www-.google.com, and the network 130 can be the Internet. In some implementations, the engine 105, the display device 110, and the input devices 115 and 120, can be part of a computer system, e.g., a desktop computer, a laptop computer, a personal digital assistant (PDA), and the like. The application can be any software application, e.g., Microsoft® Office PowerPoint®, that can be installed on the engine 105. The application can include application resources, e.g., program files related to the application, which, when installed on the engine 105, can be executed by the engine 105 to perform operations such as displaying a user interface on the display device 110, receiving input from a user via the input devices, producing output that can be displayed in the user interface on the display device 110, performing operations in the background that are not visible on the display device 110, and the like. The engine 105 can be operatively coupled to the remote engine 125 through the network 130 via wired or wireless interfaces.

An application can be installed on the engine 105, e.g., using a CD-ROM including the application or by downloading the application from the remote engine 125 over the network 130. Resources, e.g., program files, related to the application can be made available to the engine, e.g., be stored on the engine 105, such that the engine 105 can execute, e.g., instructions included in the resources, to cause a user interface to be displayed on the display device 110 operatively coupled to the engine 105, and an object, e.g., an icon, to be displayed on the display device 110. In addition, the resources can include instructions to enable a user to perform operations using the application. A user can use an input device, e.g., the keyboard 115 or the mouse 120 or both, to select the object representing the application. The engine 105 can detect that the user has selected the object and, in response, can launch the application, where, in some implementations, launching the application can include the engine 105 displaying a user interface related to the application on the display device 110 and enabling the user to interact with the user interface using the input devices, e.g., the keyboard 115, the mouse 120, and the like. In some implementations, the application can allow the user to perform several operations, e.g., add content, modify content, delete content, and the like, the results of which operations can be viewed in the user interface.

The application user interface can include several objects where each object can correspond to one or more operations that the application enables the user to perform. For example, opening a file is an operation that an application enables a user to perform, for which the application user interface can include a corresponding object, e.g., a clickable button in a menu, which a user can select. When the user selects the object, e.g., using the input devices, a default folder is displayed in the user interface, which the user can use as a starting location to identify the file that the user wishes to open. Similarly, the engine 105 can receive an input from a user through the input devices, where the input includes selecting an object corresponding to an operation, displayed in a menu of operations in the user interface of the application. In response to the selection, the engine 105 can perform the operation corresponding to the selected object, based on the application resources, stored on the engine 105, that define the operation to be performed.

In some implementations, the engine 105 can display a user interface, related to an application, on the display device 110, in which the user can enter a query, where the query relates to an operation of the application. For example, the user interface can include a text box into which a user can enter a query, e.g., a string of text, where the query can be related to an operation that can be performed by the application. The engine 105 can search the application resources, e.g., program files related to the application, to identify the one or more operations that satisfy the query. Subsequently, the engine 105 can identify the object corresponding to the searched operation, e.g., the menu where the object corresponding to the searched operation resides, and can present the identified object as a search result. For example, the engine 105 can display the menu containing the object corresponding to the searched operation and highlight the object. Alternatively, or in addition, the engine 105 can cause the searched operation to be performed.

Figure 2:
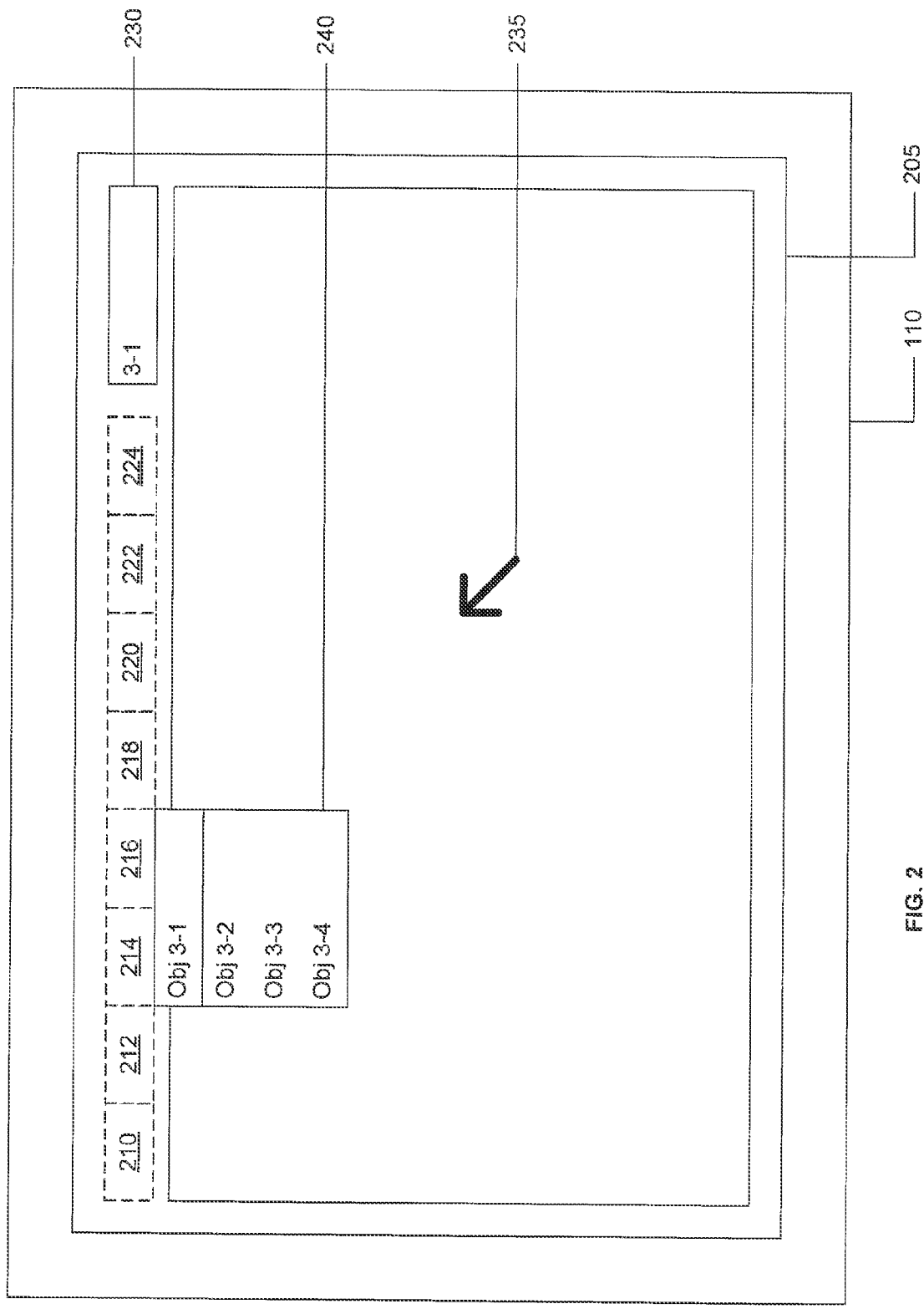
FIG. 2 is a schematic of an example of a user interface of an application.

FIG. 2 depicts a schematic of a user interface 205 of an application displayed in the display device 110 operatively coupled to the engine 105. The engine 105 can display the user interface 205 in response to receiving a selection from the user to launch the application to which the user interface 205 corresponds. The user interface 205 can include several objects 210, 212, 214, 216, 218, 220, 222, and 224 which can correspond to operations that the application can enable a user to perform or an identifier for a collection of operations or both. For example, object 210 can be titled "File", wherein object 210 represents a collection of operations, e.g., "Open", "Close", "Save", "Import", and the like, where each operation under object 210 can be accessed by selecting object 210. In another example, object 224 can be "Convert to PDF" where selecting the object 224 can cause an operation to be performed, wherein the operation, in this example, is conversion to PDF.

The user interface 205 can include a text box 230 into which a user can enter a query, e.g., a string of text by positioning the cursor 235, operated by the pointing device 120, in the text box 230, and entering text using the keyboard 115. The text can be a query related to an operation that can be performed by the application. For example, one of the operations that can be performed by the application can be titled "3-1". The object 3-1, corresponding to the operation 3-1, which the user can select in order to perform the operation 3-1, may not be apparent to the user because the object 3-1 may reside in a menu under object 214. The user can enter the title "3-1" or text that is related to the operation 3-1 in the text box 230 to search for the operation 3-1. In response, the engine 105 can identify that the operation 3-1 satisfies the query in the text box 230, identify that the operation 3-1 is represented by the object 3-1 residing in the menu under object 214, and expose the object 3-1 to the user, e.g., display the menu under object 214 in the user interface 205 as a search result 240. In addition, the engine 105 can highlight the object 3-1, e.g., by filling the object 3-1 with a color that can be readily discerned by the user. In this manner, the engine 105 can present the user with the location of an operation in response to the user's query, and enable the user to select the operation, e.g., by positioning the cursor 235 on the object 3-1 and selecting the object.

In some implementations, the engine 105 can perform the operation 3-1 upon identifying that the user was searching for the operation 3-1. For example, the application can be Microsoft® Office PowerPoint®, and the operation can be inserting a picture from a camera or scanner. The object that the user needs to select to insert a picture from a camera or scanner may reside in a menu on the user interface 205, and may, thus, not be apparent to the user. The user can enter "inserting a picture from a camera or scanner" as a query in the text box 230. The engine 105 can parse the query and identify that the operation that the user is looking for is inserting a picture from a camera or scanner. Further, by searching the application resources, the engine 105 can identify that the menu option to enable a user to perform the required operation resides under "Insert→Picture→From Scanner or Camera . . . ". The engine 105 can cause the hierarchical menu, including the object titled "From Scanner or Camera . . . " to be displayed on the user interface 205, and, in addition, perform the operation. Thus, a response to a search for "inserting a picture from a camera or scanner" can be the engine 105 accessing a scanner or camera operatively coupled to the engine 105 and enabling the user to select a picture located on the scanner or camera by displaying a selection window in the user interface 205. Although Microsoft® Office Powerpoint® and inserting a picture from camera or scanner as presented as representative examples, the above operation can be performed for any application and for any feature in an application. In some implementations, the user can perform the operation without any further input from the user. In other implementations, the user can identify an operation, present the identified operation to the user, and confirm that the user intended to select the identified operation. If the user confirms that the identified operation is the operation that the user was searching, then the engine 105 can perform the identified operation. For example, upon identifying an operation, the engine 105 can display a window including the name of the operation, a question asking if the identified operation is the one that the user was searching, and selectable buttons, such as "Yes" and "No" buttons. The engine 105 can perform the identified operation if the user selects "Yes."

Figure 3:
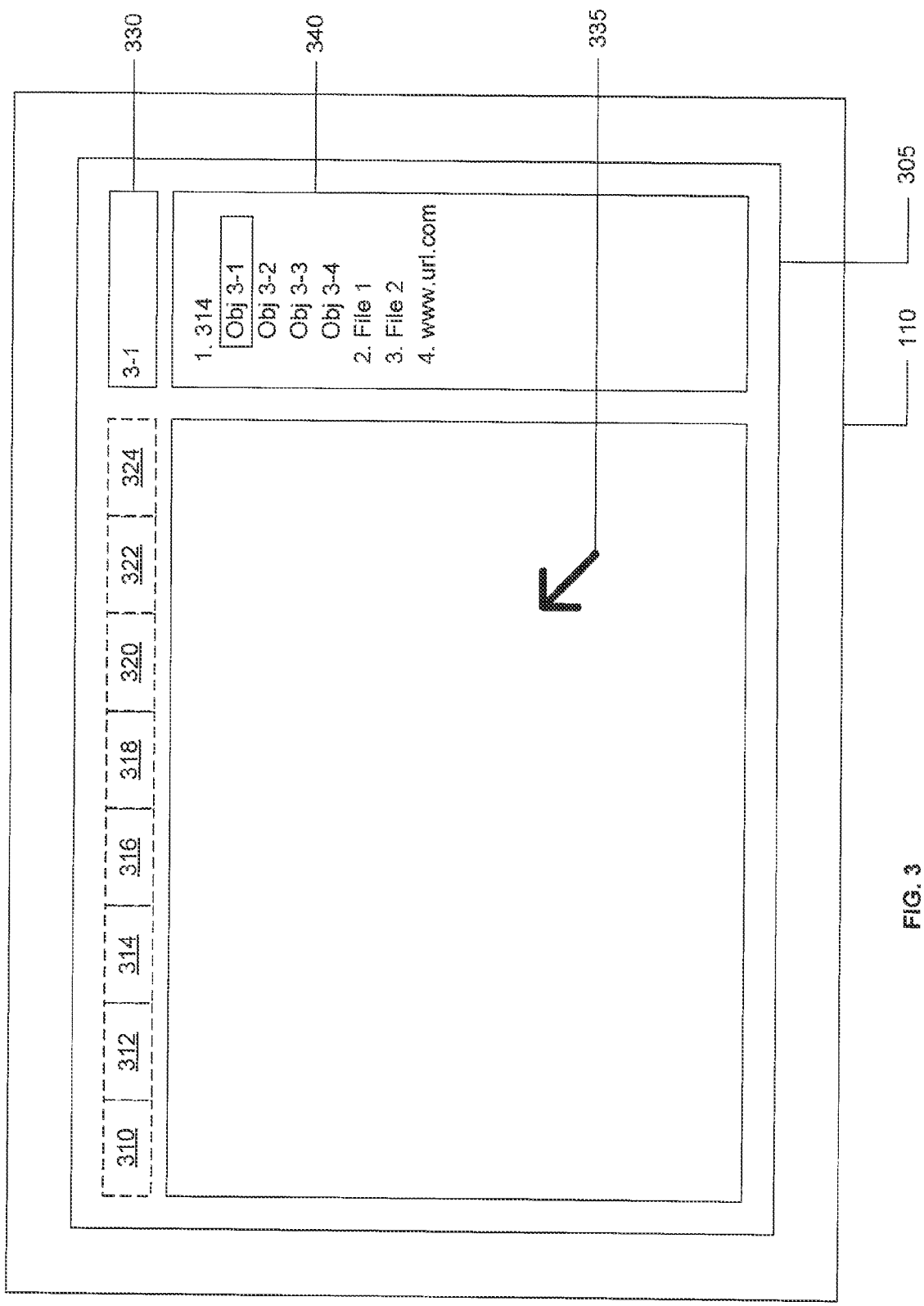
FIG. 3 is a schematic of an example of a user interface of an application.

FIG. 3 depicts a schematic of a user interface 305 of an application displayed in the display device 110 operatively coupled to the engine 105. The engine 105 can display the user interface 305 in response to receiving a selection from the user to launch the application to which the user interface 305 corresponds. The user interface 305 can include several objects 310, 312, 314, 316, 318, 320, 322, and 324 which can correspond to operations that the application can enable a user to perform or an identifier for a collection of operations or both. The user interface 305 can include a text box 330 in which a user can enter a query related to an operation that the application enables a user to perform, content that can be found in, e.g., a data file which the user created with the application, a topic related to application capabilities, and the like. When the user enters the query in the text box 330, the engine 105 can search the application resources to identify an operation that satisfies the query. In addition, the engine 105 can search data files, created using the application, for content that satisfies the query and, further, can retrieve content, related to the application that satisfies the query, residing on one or more remote engines 125, connected to the engine 105 through the network 130. The data files can reside on one or more storage devices operatively coupled to the engine 105.

For example, the user can enter "3-1" as the query in the text box 330 in the user interface 305, where the query can be a string of text. The string of text (e.g., "Insert") can correspond to an operation that can be performed by the application, e.g., inserting an object. The engine 105 can search the application resources to identify the location of the object containing the text "3-1" that corresponds to the operation that satisfies the query "3-1" entered in the text box. In addition, the engine 105 can traverse the contents stored in one or more storage devices operatively coupled to the engine 105 to identify content, e.g., data files created using the application, that satisfy the query, e.g., contain the text "3-1." Further, the engine 105 can interact with one or more search engines, e.g., Google search engine, to search one or more remote engines 125 connected to the engine 105 over the network 130 to identify content that satisfies the query, e.g., web pages on web sites that describe the operation that satisfies the query "3-1." The one or more search engines can receive the query from the engine 105 over the network, search network locations, e.g., web pages of web sites, for content relevant to the query, and can transfer the results of the search to the engine 105. The engine 105 can display the search results 340 in the user interface 305 where the results can include the location of the object "3-1" in the application, the names of one or more data files including content that satisfies the query, and identifiers, e.g., uniform resource locators (URLs), pointing to the location of one or more network locations that include content that satisfies the query. In some implementations, the engine 105 can rank the results, where the ranking can be based, e.g., on the location that was searched. For example, the engine 105 can present application operations that satisfy the query first, followed by content stored on one or more storage devices operatively coupled to the engine 105, and by content obtained from network locations. The results can further be ranked, e.g., based on the relevance of each result with respect to the search query. In some implementations, the universe of content that can be searched, including the application resources, content on storage devices, content at remote locations, and the like, can be chosen by the user. For example, the user can instruct the engine 105 to limit the search to only application resources. Alternatively, the user can instruct the engine to include content on storage devices and application resources while searching.

Figure 4:
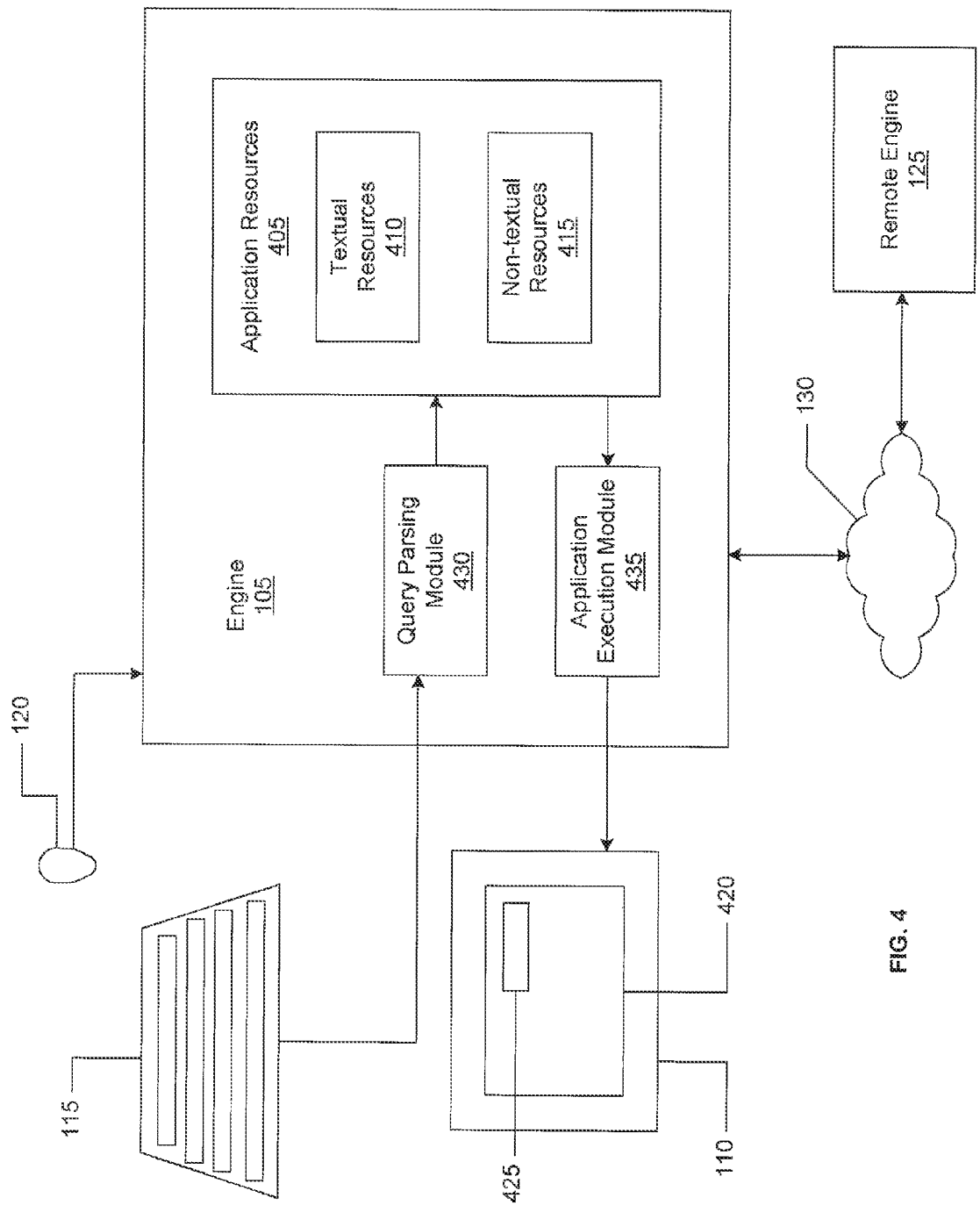
FIG. 4 is a schematic of an example of a system for searching for operations related to an application.

FIG. 4 depicts a schematic of an example of a system configured to identify locations of objects representing operations that an application can perform in response to receiving a query related to the operation. In some implementations, the system can include a display device 110 operatively coupled to the engine 105. The application can be installed on the engine 105, where installing the application can include making available to the engine 105 application resources 405, e.g., instructions to perform operations in the application, needed to operate the application, where the application resources 405 can include textual resources 410 and non-textual resources 415. For example, the application resources 405 can be made available to the engine 105 by storing the textual resources 410 and non-textual resources 425 on the engine 105 when the application is installed and enabling the engine 105 to access the application resources 420. The application resources 405 can cause the display of the user interface 405 on the display device 110 when the user launches the application. Further, when the user selects content displayed in the user interface 420 and an object representing an operation, e.g., an item titled "Cut" on a menu titled "Edit", the application resources 425 can cause the engine 105 to perform the "Cut" operation on the content selected by the user. The textual resources 410 can include resources relating to objects displaying strings of text in the user interface 420 to operations that can be performed by selecting such objects. The non-textual resources 415 can include resources relating to images displayed in the user interface 420 to operations that can be performed by selecting such images. Further, in some applications, an object displaying a string of text and an image can correspond to the same operation. Such relationships between objects displaying strings of text, corresponding images, and corresponding operations can also be stored in application resources 405. For example, the application resources 405 can be several data files hierarchically stored on a desktop file system, where such data files can include the user interface 420, provided by the application, that can be displayed on the display device 110 when the application is launched.

The engine 105 can launch the application in response to user input, e.g., a selection of an object, such as an icon, displayed on the display device 110 using the keyboard 115 or the mouse 120. The engine 105 can retrieve from application resources 405, the user interface 420, and expose the user interface 420, e.g., display the user interface 420 on the display device 110. The engine 105 can enable a user to interact with the user interface 420 using the input devices, and, in response to user inputs, perform operations where the operations performed are determined by the application resources 405. In some implementations, the user interface 420 can include a search facility 425 into which the user can enter a query, e.g., a string of text. The engine 105 can include a query parsing module 430 that can receive the query entered in the search facility 425 and can parse the query, e.g., separate the query into one or more word phrases based on the query content. Subsequently, the engine 105 can search application resources 405 for an operation that satisfies the query. For example, the query can be the word "Cut", which the query parsing module 430 can identify and compare with textual resources 410 in application resources 405 to identify instructions that need to be executed to perform the "Cut" operation. Further, the engine 105 can search application resources 405 to identify the location, in the user interface, of an object representing the "Cut" operation.

In some implementations, the engine 105 can include an operation execution module 435 configured to present the identified operation on the user interface 420. For example, the engine 105 can identify the location of the text "Cut" in the application resources 405 and the instructions to perform the "Cut" operation, and present the location and the instructions to the operation execution module 435. The operation execution module 435 can display, in the user interface 420, the location of the object including the text "Cut", which the user can select to perform the cutting operation. In other implementations, in addition to displaying the location of the object cut in the user interface 420, the operation execution module 435 can perform the operation that the user searched for.

Figure 5:
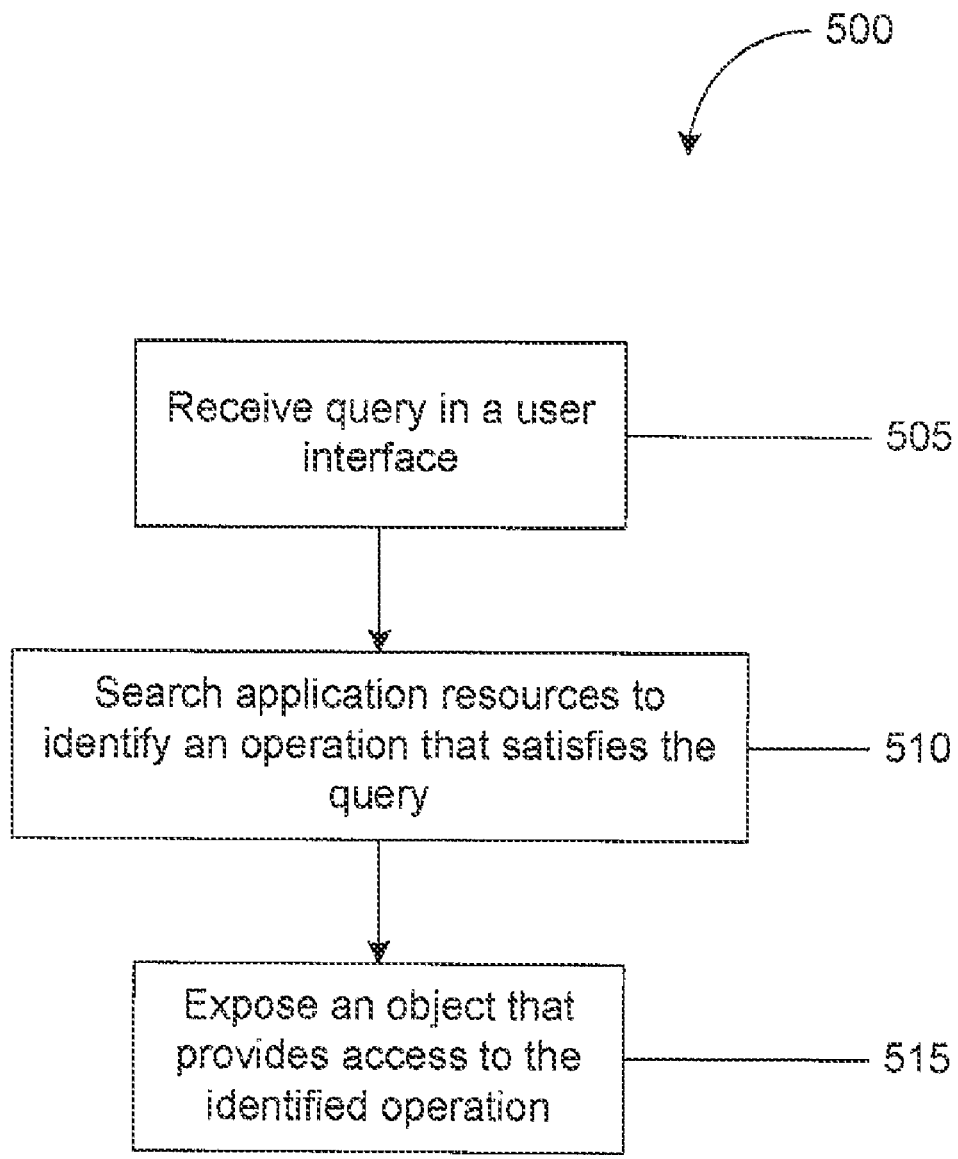
FIG. 5 is a flow chart of an example of a process for searching for an operation related to an application.

FIG. 5 depicts a flow chart of an example of a process 500 for identifying an operation related to an application in response to receiving a query. The process 500 can receive a query in a user interface at 505. For example, the engine 105 can display a user interface in a display device 110, where the user interface can be related to an application e.g., a software application such as Microsoft® Office PowerPoint®, and can be made available to the engine 105 when the application is installed in the engine 105. The user interface can include a text box into which a user can enter a query, e.g., as a string of text.

The process 500 can search application resources to identify an operation that satisfies the query at 510. For example, when an application is installed on the engine 105, application resources, needed to perform the operations of the application, can be stored on a storage device operatively coupled to the engine 105. The application resources can include the user interface and instructions to enable the engine 105 to display the user interface in a display device 110 in response to receiving instructions from the user. A user interface can be displayed on the display device 110 into which a user can enter a query, e.g., a string of text. The engine 105 can search the application resources to identify resources that satisfy the received query, e.g., compare the text in the query with the application resources to identify text in the application resources that match the text. In this manner, the engine 105 can identify operations that the application enables a user to perform, where the title of the operation satisfies the received query. For example, in response to a query "remove content", the process 500 can search the application resources and identify the operation "Delete".

The process 500 can expose an object that provides access to the identified operation 515, e.g., on the user interface on the display device 110. For example, the engine 105 can display the identified operation that satisfied the query on the user interface. The identified operation can be the title of an object that can reside in the user interface, e.g., in a menu. In response to receiving the query, the engine 105 can display the menu, in which the object corresponding to the identified operation resides, in the user interface.

Figure 6:
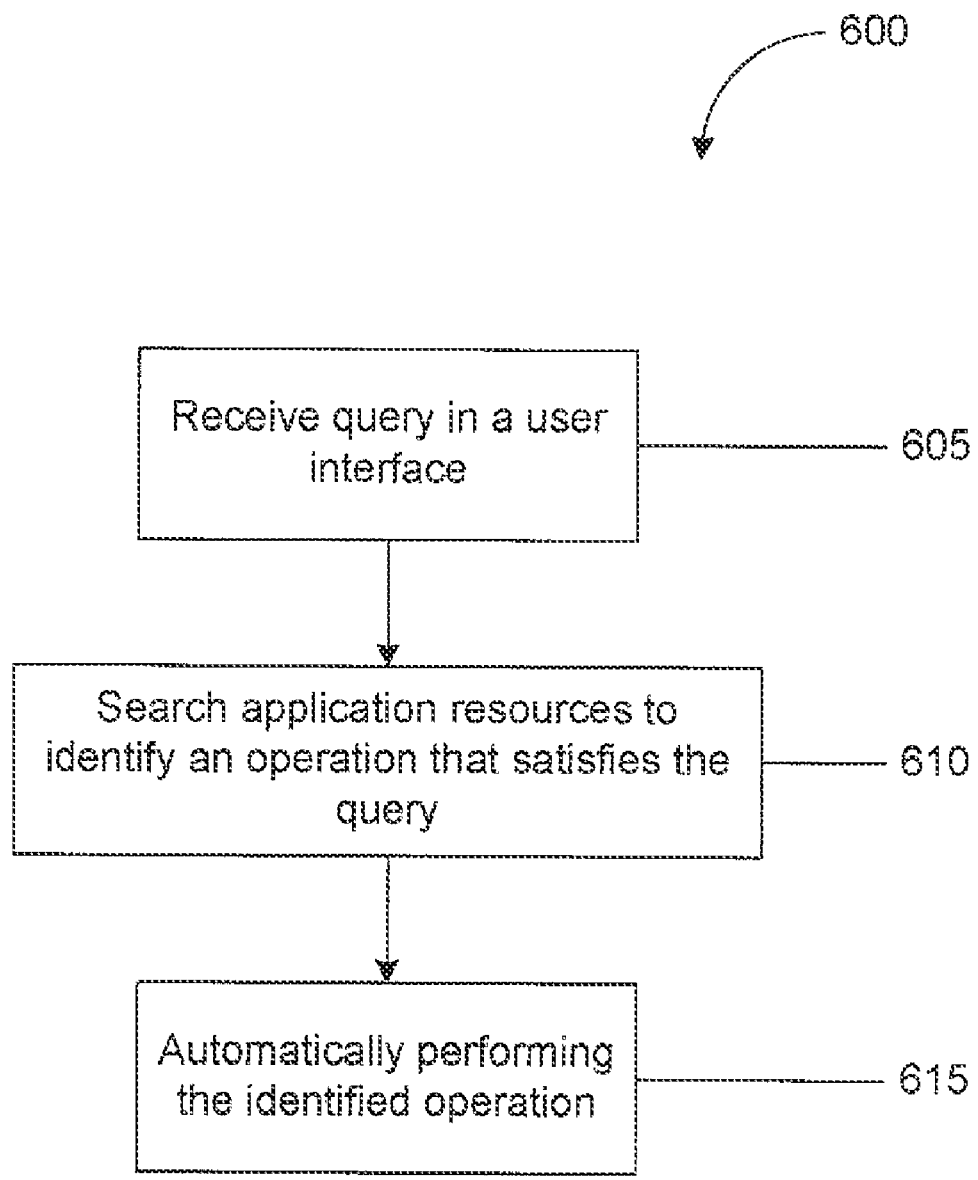
FIG. 6 is a flow chart of an example of a process for searching for an operation related to an application.

FIG. 6 depicts a flow chart of an example of a process 600 for automatically performing the operation that is identified upon searching the application resources. The process 600 can search application resources to identify an operation that satisfies the query at 610. For example, when an application is installed on the engine 105, application resources, needed to perform the operations of the application, can be stored on a storage device operatively coupled to the engine 105. The application resources can include the user interface and instructions to enable the engine 105 to display the user interface in a display device 110 in response to receiving instructions from the user. A user interface can be displayed on the display device 110 into which a user can enter a query, e.g., a string of text. The engine 105 can search the application resources to identify resources that satisfy the received query, e.g., compare the text in the query with the application resources to identify text in the application resources that match the text. In this manner, the engine 105 can identify operations that the application enables a user to perform, where the title of the operation satisfies the received query. For example, in response to a query "remove content", the process 600 can search the application resources and identify the operation "Delete".

The process 600 can automatically perform the identified operation at 615. For example, if the search query is "make letters bold", and the engine 105 identifies "Bold" as the operation that satisfies the query, the engine 105 can replace selected text in the user interface with bold text. In some implementations, the process 600 can automatically perform the identified operation without further input, e.g., from a user. In other implementations, the process 600 can confirm that the identified operations are the operations that the user was searching for, prior to automatically performing the identified operation.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and sewer arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, in some implementations, the user interface into which a user can enter the query can be unrelated to any application and can be designed to enable a user to search for operations in several applications. When the user interface receives a query, the engine 105 can search application resources related to one or more applications installed on the engine 105 and identify operations in one or more of the several applications that satisfy the search query. For example, if the user enters "Crop" as a search query in the user interface, the engine 105 can search application resources related to several applications and identify all applications that enable a user to perform the "Crop" operation. Subsequently, the engine 105 can generate identifiers to each operation corresponding to each application and provide the generated identifier to the user, wherein, when the user selects an identifier, the user interface of the corresponding application and the location of the object representing the operation that matched the user's query can be displayed in the display device 110.

In some implementations, in addition to displaying the location of objects representing the operations that satisfy the query, the engine 105 can display icons representing the operations. For example, the "Open" operation, that enables a user to open a file in an application can also be represented, by an icon, e.g., a half-open manila folder. If the operation that satisfies the query presented in the user interface is the "Open" operation, in addition to displaying the location of the object corresponding to the "Open" operation in the user interface, the engine 105 can also display the icon representing the "Open" operation on the user interface. If the icon is already displayed in the user interface, the engine 105 can highlight the icon so that it is readily discerned by the user. The engine 105 can identify the icon corresponding to an operation by scanning the application resources stored in the engine 105 when the application was installed.

In some implementations, the engine 105 can index the application resources to search for operations that satisfy queries quicker and in a more efficient manner. The engine 105 can include a crawler configured to traverse the application resources, e.g., the data files that are made available to the engine 105 when the application is installed, to create the indexed application resources.

In some implementations, the resources of the engine 105 can be included with the application such that when the application is installed, the resources of the engine 105 are automatically installed or are provided to a user as an option to install. In other implementations, the engine 105 and the resources of the engine 105 can be made available as a separate feature which can be added to any application, e.g., in the form of a plug-in.

In some implementations, the application resources can reside at a remote location, e.g., a host of a web site, to which the engine 105 can be operatively coupled over the network. In such implementations, when a query searching for the location of objects representing operations is entered in a user interface, the engine 105 can search the application resources residing at the remote location to identify locations of objects representing the operations that satisfy the query. The identified locations can be displayed on a display device 110 operatively coupled to the engine 105.

In some implementations, the universe of resources that is searched in response to receiving a search query can be controlled by a user. For example, the user can choose to search only application resources in response to receiving a search query. In other implementations, the user can choose to include content stored in one or more storage devices operatively coupled to the engine 105 and the content available at remote locations operatively coupled to the engine 105 via the network, in addition to the application resources, in the universe of resources that are searched. In some implementations, the objects representing the operations can reside in one or more of tabbed windows, dialog boxes, sub-menus, sub-tabbed windows, sub-tabbed dialog boxes, and the like. Accordingly, other implementations are within the scope of the following claims.

The invention claimed is:

1. A method comprising:
    executing a software application on a computing device, the software application having a user interface that includes a menu that provides access to operations that the software application is configured to perform;
    receiving a query that relates to at least one of the operations;
    generating query results that include (1) an identifier for each of the operations that is responsive to the query and (2) at least one resource that is responsive to the query, wherein the at least one resource includes instructions to perform at least one of the operations that is responsive to the query;
    identifying an operation from the query results;
    identifying, using the computing device, a menu item that corresponds to the identified operation, wherein the menu items are capable of being activated to cause the identified operation to be performed; and
    exposing a location within the menu of the menu item.

2. The method of claim 1, further comprising: displaying, in a result list of the user interface of the software application, the query results.

3. The method of claim 2, further comprising:
    receiving a selection of the identified operation using the result list; and
    performing the selected operation.

4. The method of claim 2, wherein displaying the query results in the result list comprises:
  sorting the generated query results based at least in part on whether the query results correspond to menu items or to resources; and
  displaying the query results in an order as sorted.

5. The method of claim 2, wherein displaying the query results in the result list comprises:
  sorting the generated query results based at least in part on relevance of the query results to the query; and
  displaying the query results in an order as sorted.

6. The method of claim 1, wherein exposing the location comprises displaying with the user interface the location within the menu of the menu item.

7. The method of claim 1, wherein exposing the location comprises highlighting the menu item.

8. The method of claim 1, wherein exposing the location comprises displaying with the user interface a navigational structure of the menu that is used to navigate to the location within the menu of the menu item.

9. The method of claim 1, wherein the menu comprises a hierarchical menu that includes two or more hierarchical levels of menu items, and wherein exposing the location comprises visually expanding at least a portion of the menu to the hierarchical level at which the menu item is located.

10. The method of claim 1, wherein the user interface comprises a display device for displaying the menu and one or more input devices for inputting the query.

11. The method of claim 10, wherein the one or more input devices includes a voice input device, and wherein the query comprises a voice-based query that is received via the voice input device.

12. A non-transitory computer-readable storage medium comprising instructions that, when executed, cause one or more processors to:
  execute a software application on a computing device, the software application having a user interface that includes a menu that provides access to operations that the software application is configured to perform;
  receive a query that relates to at least one of the operations;
  generate query results that include (1) an identifier for each of the operations that is responsive to the query and (2) at least one resource that is responsive to the query, wherein the at least one resource includes instructions to perform at least one of the operations that is responsive to the query;
  identify an operation from the query results;
  identify, using the computing device, a menu item that corresponds to the identified operation, wherein the menu items are capable of being activated to cause the identified operation to be performed; and
  expose a location within the menu of the menu item.

13. The non-transitory computer-readable storage medium of claim 12, further comprising instructions that, when executed, cause one or more processors to:
  display, in a result list of the user interface of the software application, the query results.

14. The non-transitory computer-readable storage medium of claim 13, further comprising instructions that, when executed, cause one or more processors to:
  receive a selection of the identified operation using the result list; and
  perform the selected operation.

15. The non-transitory computer-readable storage medium of claim 13, wherein the instructions to display the query results in the result list comprise instructions to:
  sort the generated query results based at least in part on whether the query results correspond to menu items or to resources; and
  display the query results in an order as sorted.

16. The non-transitory computer-readable storage medium of claim 13, wherein the instructions to display the query results in the results list comprise instructions to:
  sort the generated query results based at least in part on relevance of the query results to the query; and
  display the query results in an order as sorted.

17. The non-transitory computer-readable storage medium of claim 12, wherein the user interface comprises a display device for displaying the menu and one or more input devices for inputting the query.

18. The non-transitory computer-readable storage medium of claim 17, wherein the one or more input devices includes a voice input device, and wherein the query is a voice-based query that is received via the voice input device.

19. The non-transitory computer-readable storage medium of claim 12, wherein the instructions to expose the location comprise instructions to:
  display with the user interface the location within the menu of the menu item.

20. The non-transitory computer-readable storage medium of claim 12, wherein the instructions to expose the location comprise instructions to:
  highlight the menu item.

21. The non-transitory computer-readable storage medium of claim 12, wherein the instructions to expose the location comprise instructions to:
  display, with the user interface, a navigational structure of the menu that is used to navigate to the location within the menu of the menu item.

22. The non-transitory computer-readable storage medium of claim 12, wherein the menu is a hierarchical menu that includes two or more hierarchical levels of menu items, and wherein the instructions to expose the location comprise instructions to:
  visually expand at least a portion of the menu to the hierarchical level at which the menu item is located.

23. A computing system comprising:
  a display device;
  one or more processors;
  an application operable by the one or more processors to present, on the display device, a user interface having a menu that provides access to operations that the software application is configured to perform, receive a query that relates to at least one of the operations, generate query results that include (1) an identifier for each of the operations that is responsive to the query and (2) at least one resource that is responsive to the query, wherein the at least one resource includes instructions to perform at least one of the operations that is responsive to the query, identify an operation from the query results, identify a menu item that corresponds to the identified operation, and expose a location within the menu of the menu item.

24. The computing system of claim 23, wherein the application is further operable by the processor to present, in a result list of the user interface, the query results.

25. The computing system of claim 24, wherein the application is further operable by the processor to receive a selection of an operation of the at least one operation that is responsive to the query using the result list, and perform the selected operation.

26. The computing system of claim 24, wherein the application is operable by the processor to present the query results in the result list by at least being operable to:

sort the generated query results based at least in part on whether the query results correspond to menu items or to resources; and present the query results in an order as sorted.

27. The computing system of claim 24, wherein the application is operable by the processor to present the query results in the result list by at least being operable to:

sort the generated query results based at least in part on relevance of the query results to the query; and display the query results in an order as sorted.

28. The computing system of claim 23, wherein the application is operable by the processor to expose the location by at least being operable to:

display, on the display device, the location within the menu of the menu item.

29. The computing system of claim 23, wherein the application is operable by the processor to expose the location by at least being operable to:

highlight the menu item on the display device.

30. The computing system of claim 23, wherein the application is operable by the processor to expose the location by at least being operable to:

display, on the display device, a navigational structure of the menu that is used to navigate to the location within the menu of the menu item.

31. The computing system of claim 23, wherein the menu is a hierarchical menu that includes two or more hierarchical levels of menu items, and wherein the application is operable by the processor to expose the location by at least being operable to:

visually expand at least a portion of the menu on the display device to the hierarchical level at which the menu item is located.

32. The computing system of claim 23, further comprising:

a keyboard input device, wherein the query is a text-based query that is received via the keyboard input device.

33. The computing system of claim 23, further comprising:

a voice input device, wherein the query is a voice-based query that is received via the voice input device.

* * * * *